United States Patent [19]

Hisazawa

[11] 4,205,301
[45] May 27, 1980

[54] ERROR DETECTING SYSTEM FOR INTEGRATED CIRCUIT

[75] Inventor: Masahide Hisazawa, Yokohama, Japan

[73] Assignee: Fujitsu Limited, Japan

[21] Appl. No.: 887,919

[22] Filed: Mar. 17, 1978

[30] Foreign Application Priority Data

Mar. 17, 1977 [JP] Japan .................... 52-29644

[51] Int. Cl.² .................................. G06F 11/10
[52] U.S. Cl. .................................. 371/3; 371/48
[58] Field of Search ............ 340/146.1 AG; 235/306

[56] References Cited

U.S. PATENT DOCUMENTS

| | | | |
|---|---|---|---|
| 3,465,132 | 9/1969 | Crockett et al. | 235/302.4 |
| 3,573,727 | 4/1971 | Freeny | 340/146.1 AG |
| 3,629,825 | 12/1971 | Bloom, Jr. | 340/146.1 AG |
| 3,685,015 | 8/1972 | Bucek | 340/146.1 AG |
| 3,863,217 | 1/1975 | Taylor | 340/146.1 AG |
| 3,946,216 | 3/1976 | Dierendonck | 364/900 |
| 4,001,818 | 1/1977 | Radichel et al. | 235/306 |
| 4,035,766 | 7/1977 | Barker | 340/146.1 AG |
| 4,044,328 | 8/1977 | Herff | 340/146.1 AG |

Primary Examiner—David H. Malzahn
Attorney, Agent, or Firm—Staas & Halsey

[57] ABSTRACT

An integrated circuit such as a microprocesser in which a plurality of the digital functional blocks are provided with error detecting circuits, and a log-out mechanism is provided for outputting the result of operation of the error detecting circuits to the outside.

6 Claims, 5 Drawing Figures

ERROR DETECTING SYSTEM FOR INTEGRATED CIRCUIT

BACKGROUND OF THE INVENTION

1. Field of the Invention

This invention relates to an integrated circuit in which a plurality of digital functional blocks are provided with a parity check system or some other form of redundancy and an error detecting circuit is provided for all or some of the functional blocks and which is designed so that the result of operation of the error detecting circuit can be provided to the outside.

2. Description of the Prior Art

One method that has heretofore been employed for diagnosing a combinatorial or sequential circuit is, for instance, a method using a fault simulator. This conventional method of diagnosis is relatively easy to employ for an integrated circuit having several thousand gates. However, in the case of an integrated circuit having dozens to hundreds of thousand gates as a result of increased integration density, it is assumed that the conventional diagnosing method using the fault simulator would impose a great burden on the operation of the integrated circuit.

SUMMARY OF THE INVENTION

One object of this invention is to provide an integrated circuit which is constructed to allow easy diagnosis.

Another object of this invention is to provide an integrated circuit which has a high degree of reliability without being restricted by the integrated circuit manufacturing techniques.

Still another object of this invention is to provide an integrated circuit which is constructed to shorten the downtime of its system and minimize the cost of the total system.

The above objects are achieved by providing an integrated circuit which has a plurality of digital functional blocks which are provided with a parity check system or some other form of redundancy, an error detecting circuit provided for all or some of the functional blocks and a log-out mechanism for outputting the result of operation of the error detecting circuit to the outside.

DESCRIPTION OF THE PREFERRED EMBODIMENTS

Figure 1:
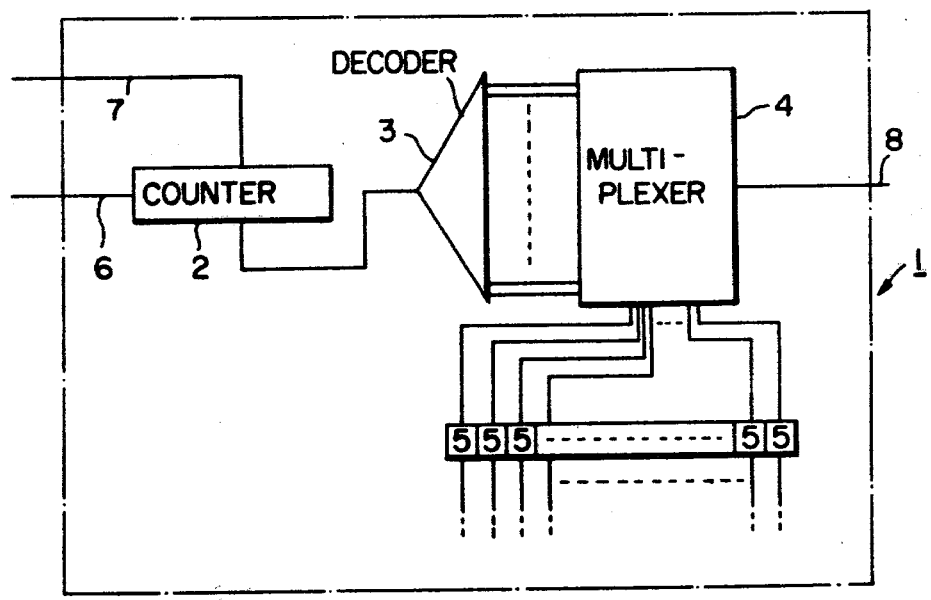
FIG. 1 is a schematic block diagram showing in outline a log-out mechanism the principal part of an embodiment of this invention.
Figure 2:
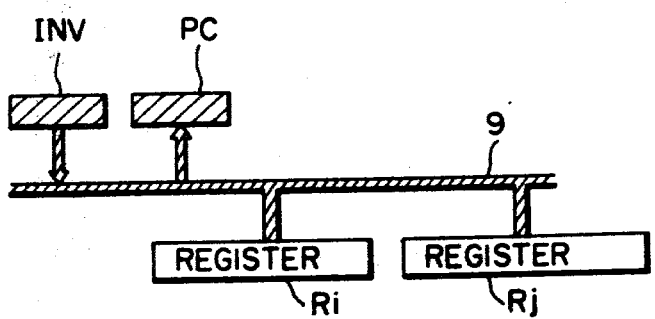
FIG. 2 is a diagram showing a parity check circuit and a validity checking code generator which may be used in the integrated circuit of the present invention.
Figure 3:
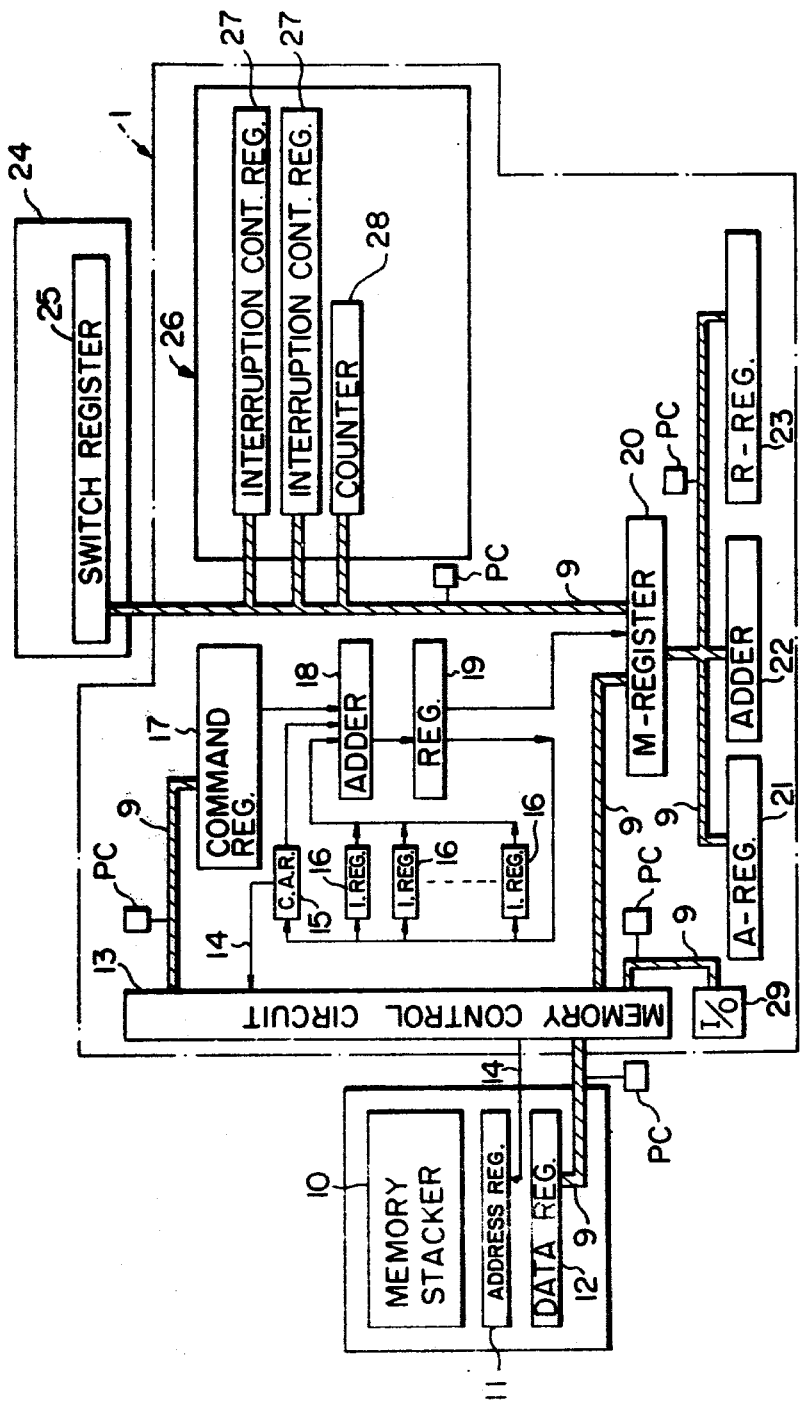
FIG. 3 is a schematic block diagram showing an example of the functional blocks of a one-chip central processing unit employed on the same chip as the log-out mechanism disclosed herein.

In FIG. 1, reference numeral 1 indicates a large scale integrated circuit; 2 designates a counter, which serves as a serial-parallel converter; 3 identifies a decoder; 4 denotes a multiplexer; 5 represents flip-flops; 6 shows an error log address assignment line; 7 refers to a read clock line; and 8 indicates an error log-out line. In FIG. 2, 9 designates a data bus or address bus; Ri and Rj identify arbitrary registers; PC denotes a parity check circuit; and INV represents a validity checking code generator. In FIG. 3, 10 shows a memory stacker; 11 indicates an address register; 12 designates a data register; 13 identifies a memory control circuit; 14 denotes an address bus; 15 represents a command address register; 16 shows index registers; 17 refers to a command register; 18 indicates an adder for addressing; 19 designates a register; 20 identifies an M-register; 21 denotes an A-register; 22 represents an adder; 23 shows an R-register; 24 indicates a console; 25 designates a switch register; 26 identifies a circuit for interruption memory protection and other control operations; 27 denotes an interruption control register; 28 represents a counter; and 29 shows an I/O interface control circuit. The A-register 21, the R-register 23 and the M-register 20 are operation registers. The one-dot chain line block is the integrated circuit 1 of one chip. The integrated circuit 1 includes various control circuits, registers, counters, adders, bus lines, and other functional blocks, though not shown in FIG. 1.

In FIG. 2, the data bus or address bus 9 includes a parity check bit and the registers Ri and Rj also include parity check bits. The parity check circuit PC performs a parity check on the bus 9 and the check result is stored in the corresponding one of the flip-flops 5 (FIG. 1). The validity checking code generator INV provides an inhibit code to the bus 9 for checking whether the parity check circuit PC operates normally or not. The validity checking code generator INV is programmatically controllable from the outside.

FIG. 2 shows only the parity check circuit PC for the bus 9 but it is possible, of course, to provide parity check circuits for the registers Ri and Rj. In the integrated circuit 1 depicted in FIG. 3, the functional blocks are all structured to have check bits and, though not shown, parity check circuits are provided for all of the functional blocks or at required places. The operational results of the parity check circuits are stored in those of the flip-flops 5 (FIG. 1) corresponding to them, respectively.

In FIG. 1, a serial code, corresponding to one of the flip-flops 5, on the error log address assignment line 6 is converted by the counter 2 or the serial-parallel converter into a parallel code upon application of a clock signal via the read clock line 7. The parallel code is decoded by the decoder 3 for input to the multiplexer 4. The multiplexer 4 opens an assigned one of its gates (not shown), through which the content of that one of the flip-flops 5 corresponding to the assigned gate is outputted to the outside via the data log-out line 8. The integrated circuit of FIG. 1 has the function of setting or resetting the flip-flops 5 from the outside, though not shown.

Figure 1A:
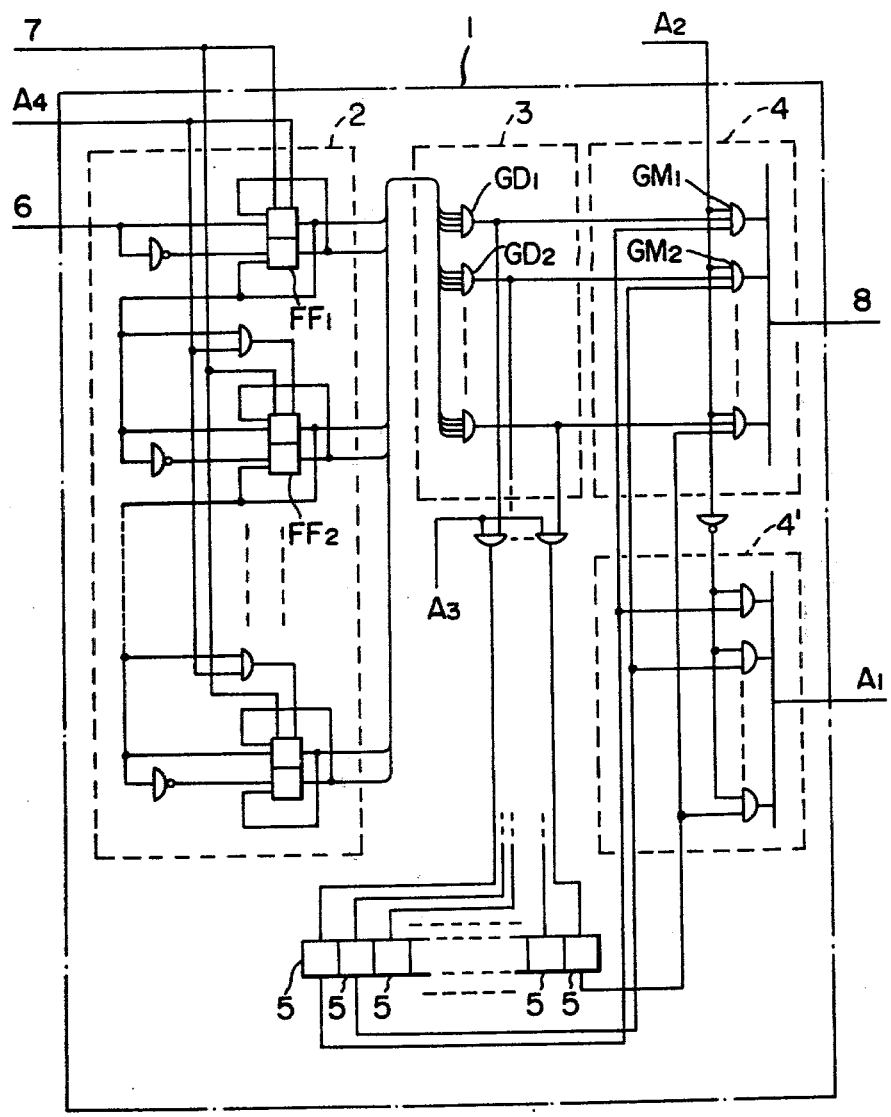
FIG. 1A is a schematic circuit diagram illustrating a specific operative structure of the embodiment of FIG. 1.

FIG. 1A illustrates a specific operative example of the structure of the integrated circuit shown in FIG. 1. In FIG. 1A, the counter 2 performs the functions of a shift register and a counter, and includes flip-flops $FF_1$, $FF_2$, .... In the case of the counter 2 being used as a shift register, when a counter enable signal $A_4$ input is "0", the serial data from the error log address assignment line 6 which designates a particular flip-flop 5 is shifted in the shift register in accordance with the clock signal from the read clock line 7 and set in the flip-flop of each stage. When the counter enable signal $A_4$ input is "1", the counter 2 serves as a counter in which 1 is added to the value at this moment in accordance with the clock signal from the read clock line 7 and the flip-flops 5 are scanned.

The decoder 3 is composed of gates $GD_1$, $GD_2$, ... merely for the AND operation of the Q or $\bar{Q}$ outputs from desired stages of the counter 2. By making a signal $A_3$ input "1", "1" is provided at the reset input of the flip-flop 5 designated by the decoder 3 at that time to reset the flip-flop after it has been set upon detection of an error by its corresponding parity check circuit.

When supplied with a signal $A_2$ for switching the error detecting mode, the multiplexer 4 opens a designated one of its gates $GM_1$, $GM_2$, ..., through which the content of the corresponding one of the flip-flops 5 is outputted to the outside via the data log-out line 8. A broken line block 4' in FIG. 1A is provided for generating an OR signal $A_1$ output, when the signal on $A_2$ is "0", when any one of the the flip-flops 5 becomes "1".

Though not illustrated, where the number of flip-flops 5 is relatively small, that is where the number of error log address bits is small, the operation can be further speeded up by providing a register in place of the counter 2 and setting therein a plurality of bits of an error log address in parallel from the outside of the integrated circuit.

The aforesaid two embodiments are both designed to designate a desired one of a plurality of flip-flops and output the content of the designated flip-flop alone. Also, it is possible to employ a simpler form, though not shown, in which the flip-flops 5 are formed as individual stages of a shift register and the contents of all the flip-flops 5 are read out serially. In this instance, it is impossible to designate only a desired one of the flip-flops and read it out but the counter 2, the decoder 3 and the multiplexer 4 utilized in FIG. 1 need not be provided. Further, all the flip-flops can be easily cleared and, if a register capable of both parallel input and serial input operations is used as the shift register, a desired value can be set at each stage of the shift register by shifting-in the desired serial data from outside.

In the above embodiments, redundancy is provided in the functional blocks by the employment of the parity check system but redundancy can also be introduced by the use of other systems, for example, a self check system, or a method of forming the functional blocks double.

Figure 4:
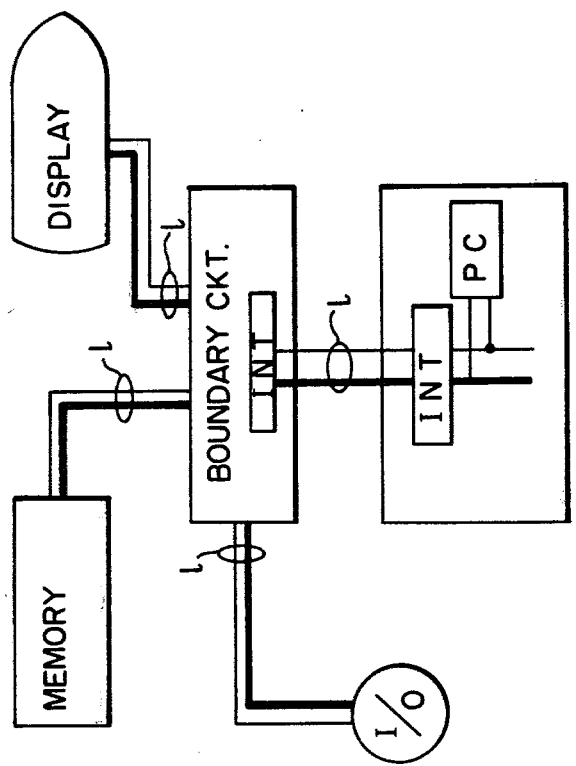
FIG. 4 is a diagram illustrating the boundary between an integrated circuit of the present invention and other units.

FIG. 4 illustrates the boundary between the integrated circuit 1 and other units, for instance, and I/O device, a memory, a display, etc. Also in the boundary between the integrated circuit 1 and other units, it is necessary to distinguish between faults inside and outside of the integrated circuit 1 by using a logical system of high reliability. To perform this, it is preferred to employ such a method as shown in FIG. 4 in which redundant bits are provided in connection lines 1 connecting all of the units. In FIG. 4, thick lines are data signal lines and thin lines are parity check bit signal lines. The parity bit is generated by the parity check circuit PC, and outputted via an interface circuit INT to the outside along with other signals. Of course, a parity circuit is provided also in the case of receiving information, though not shown.

As is evident from the above, in the integrated circuit of this invention, since a check is always made in the course processing, a test can be effected by using test data for its function test (an ordinary function test program) without the necessity of specially forming test data by simulation of the logic of the integrated circuit as in the prior art. The following shows the results of comparison between a computer using two one-chip central processing units, each made according to this invention (which computer will hereinbelow be referred to as the computer A), and a conventional computer using two non-redundant one-chip central processing units (which computer will hereinbelow be referred to as the computer B).

(a) Unit cost ratio

Assuming that the use of the redundancy logic increases the cost by 25%,

Computer A: 1.25M (M: unit cost without redundancy)

Computer B: 1M (b) Multiplexing cost ratio

Computer A: $1.25M \times 2 = 2.5M$

Computer B: $(2+1)M = 3M$ (on the assumption that the majority decision or matching system is adopted.)

(c) Diagnosis

Computer A

A fault can be located easily, accurately and instantly.

Computer B

A diagnosis of the fault location is very difficult. In the case where the system is in the on-line state, the diagnosis will be more difficult.

(d) Logical processing speed

Computer A

A parity check is effected at each stage and when the check result is okayed, processing proceeds to the next stage. That is, an asynchronous system design can be adopted and the operation can be speeded up to a maximum limit of a component of the highest speed in the system.

Computer B

Generally, only a synchronous system design can be used. The operation is restricted by the speed of a component of the lowest speed in the system.

(e) Throughput per unit cost

Computer A $2/2.5M = 0.8/M$ (Since the two central processing units forming the system each employ the parity check, they can be used independently of each other.)

Computer B $\frac{1}{3}M = 0.3/M$.

As is apparent from the above, in the case of producing a computer having more than one central processing unit as mentioned above, the use of the one-chip central processing unit of this invention provides a computer which is markedly excellent in terms of the multiplexing cost, diagnosis, the logical processing speed and the throughput, as compared with the prior art computers. Further, this invention ensures reliability of LSI elements of increased integration density, and provides an inexpensive digital information processing unit as a total system.

It will be apparent that many modifications and variations may be effected without departing from the scope of the novel concepts of this invention.

What is claimed is:

1. An integrated circuit comprising:
    a plurality of cooperating functional block means for processing digital signals, each block comprising digital circuitry and being formed with redundancy means for allowing detection of malfunctions;

a plurality of error detecting circuit means, each connected to one of said functional block means, for detecting malfunctions of the corresponding functional block means;

a plurality of memory element means, each connected to one of said error detecting circuit means, for storing a predetermined value when the corresponding error detecting circuit means detects a malfunction; and a log-out mechanism means, connected to said plurality of memory element means, for outputting the contents of said memory element means to the outside of the integrated circuit.

2. An integrated circuit according to claim 1, further comprising reset means connected between each of said plurality of memory element means and said log-out mechanism means for resetting said memory element means according to a designation from the outside of the integrated circuit.

3. An integrated circuit according to claim 1 or 2, further comprising validity checking code generator means for checking the validity of at least one of said plurality of error detecting circuit means.

4. An integrated circuit according to claim 2, wherein said log-out mechanism means further comprises a counter, a decoder connected to said counter, and a multiplexer, said multiplexer being connected to said decoder and to said plurality of memory element means.

5. An integrated circuit according to claim 2, wherein said log-out mechanism means further comprises a register, a decoder connected to said register, and a multiplexer, said multiplexer being connected to said decoder and to said plurality of memory element means.

6. An integrate circuit according to claim 2, wherein said plurality of memory element means comprises a shift register.

* * * * *

UNITED STATES PATENT AND TRADEMARK OFFICE
CERTIFICATE OF CORRECTION

PATENT NO. : 4,205,301
DATED : May 27, 1980
INVENTOR(S) : Masahide Hisazawa

It is certified that error appears in the above–identified patent and that said Letters Patent are hereby corrected as shown below:

Abstract, line 2, "are" should be --is--;

Col. 1, line 8, "are" should be --is--;

Col. 1, line 21, "thousand" should be --thousands of--;

Col. 1, line 49, after "mechanism" insert --forming--;

Col. 3, line 6, after "7" insert --,--;

Col. 3, line 59, "1" (number) should be --l-- (letter);

Col. 4, line 1, after "course" insert --of--;

Col. 4, line 23, "adopted.)" should be --adopted).--;

Col. 6, line 16, "integrate" should be --integrated--.

Signed and Sealed this

Eighteenth Day of November 1980

[SEAL]

Attest:

SIDNEY A. DIAMOND

Attesting Officer

Commissioner of Patents and Trademarks